United States Patent
Womack et al.

(10) Patent No.: US 12,005,957 B2
(45) Date of Patent: Jun. 11, 2024

(54) VARIABLE GAUGE CRADLE

(71) Applicants: MAGNA INTERNATIONAL INC., Aurora (CA); Darren Womack, Windsor (CA); Nikhil Kripasagar Bolar, Royal Oak, MI (US)

(72) Inventors: Darren Womack, Windsor (CA); Nikhil Kripasagar Bolar, Royal Oak, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 256 days.

(21) Appl. No.: 17/607,542

(22) PCT Filed: May 1, 2020

(86) PCT No.: PCT/US2020/030953
§ 371 (c)(1),
(2) Date: Oct. 29, 2021

(87) PCT Pub. No.: WO2020/223599
PCT Pub. Date: Nov. 5, 2020

(65) Prior Publication Data
US 2022/0242486 A1    Aug. 4, 2022

Related U.S. Application Data

(60) Provisional application No. 62/842,212, filed on May 2, 2019.

(51) Int. Cl.
*B62D 21/11*    (2006.01)
*B32B 15/01*    (2006.01)

(52) U.S. Cl.
CPC ............ *B62D 21/11* (2013.01); *B32B 15/011* (2013.01)

(58) Field of Classification Search
CPC ......... B62D 21/00; B62D 21/11; B32B 15/00; B32B 15/01; B32B 15/011
See application file for complete search history.

(56) References Cited

U.S. PATENT DOCUMENTS 6,375,249 B1    4/2002    Stanton et al.
9,409,607 B2 *  8/2016    Osten .................... B32B 17/067
(Continued)

FOREIGN PATENT DOCUMENTS

| CA | 3001892 A1 | 3/2012 |
| CN | 207535984 U | 6/2018 |
| WO | 2018050976 A1 | 3/2018 |

OTHER PUBLICATIONS

China National Intellectual Property Administration; CN Office Action for corresponding CN application No. 202080033161.4 dated Aug. 21, 2023; 7 pgs; English translation 10 pgs.

*Primary Examiner* — Lori Lyjak
(74) *Attorney, Agent, or Firm* — Dickinson Wright PLLC

(57) ABSTRACT

A cradle for being used in automotive vehicles for supporting various automotive components includes a structure with variable thickness, defining a variable gauge cradle. The variable gauge cradle has a minimum thickness and maximum thickness, with various other thicknesses therebetween. The minimum thickness is less than an original thickness of a reference cradle in which the thickness is the same. The variable gauge cradle allows specific locations to be locally increased in thickness to achieve the desired stiffness at the areas requiring the increased stiffness, while leaving areas requiring a lower stiffness at a lesser thickness. The variable gauge cradle therefore may have a lower mass than the reference cradle. The thickness may be increased relative to the minimum thickness using patches that are (Continued)

bonded to a base layer or panel of the cradle. The patches may be distributed at different locations to create different thicknesses.

21 Claims, 13 Drawing Sheets

(56) References Cited

U.S. PATENT DOCUMENTS

| | | | |
|---|---|---|---|
| 9,533,716 B2 * | 1/2017 | Stanton | B62D 21/18 |
| 11,479,305 B2 * | 10/2022 | Brandley | B62D 29/043 |
| 2002/0140239 A1 | 10/2002 | Kettler et al. | |
| 2013/0161933 A1 | 6/2013 | Marten et al. | |
| 2014/0001791 A1 | 1/2014 | Belpaire et al. | |
| 2014/0182966 A1 | 7/2014 | Fisk et al. | |
| 2015/0353138 A1 | 12/2015 | Fenton | |
| 2016/0052564 A1 | 2/2016 | Graefe et al. | |
| 2017/0183036 A1 | 6/2017 | Murata et al. | |

* cited by examiner

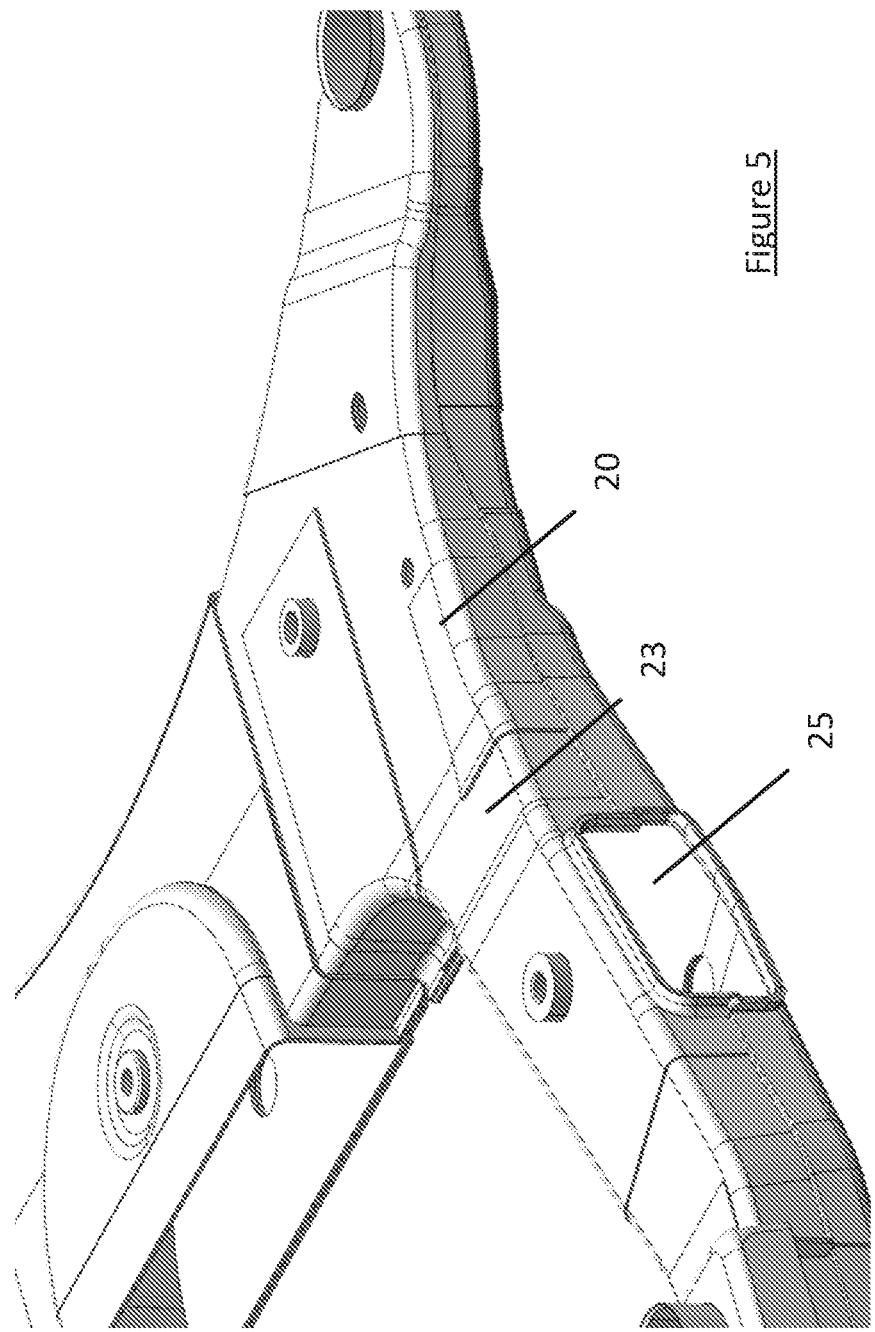

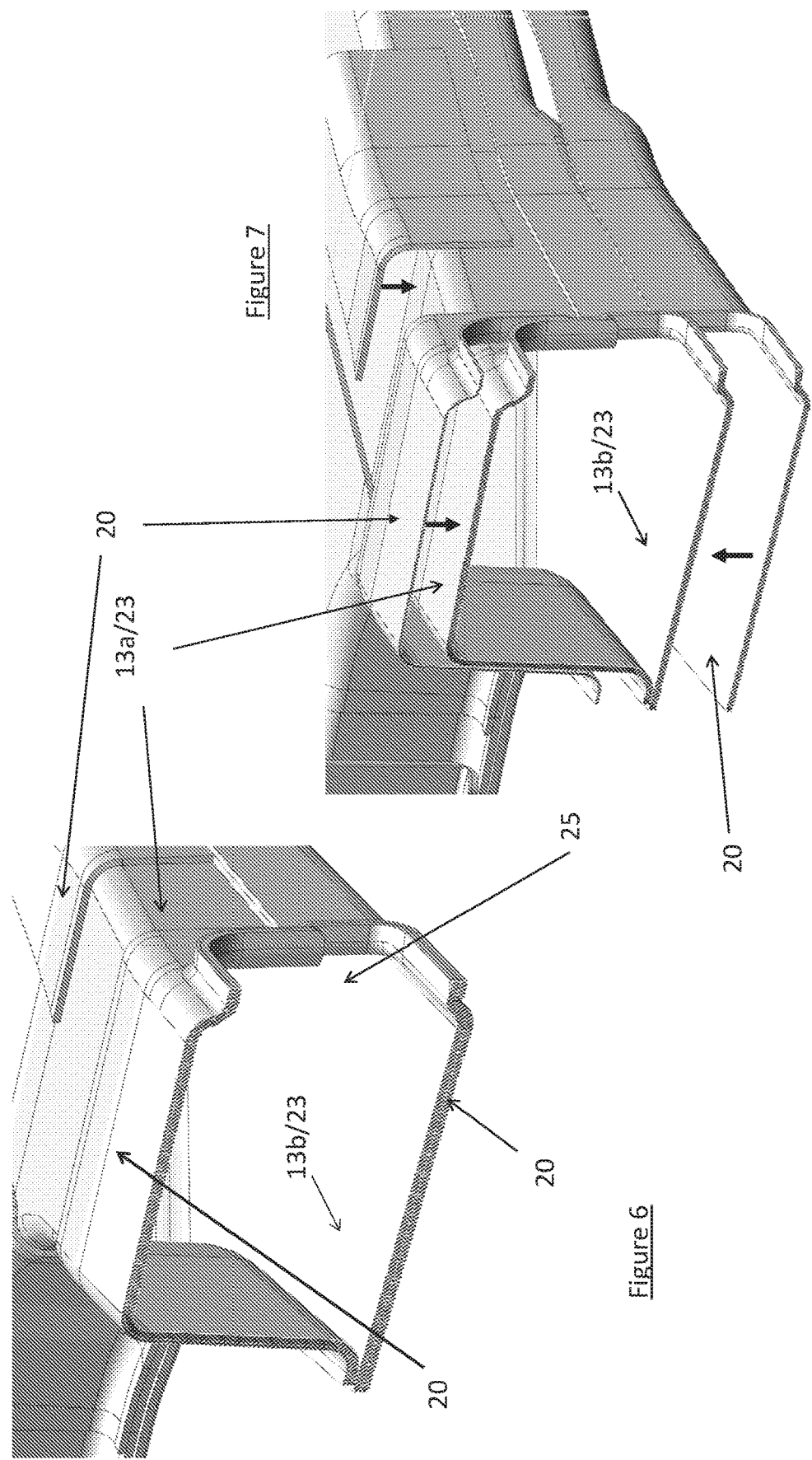

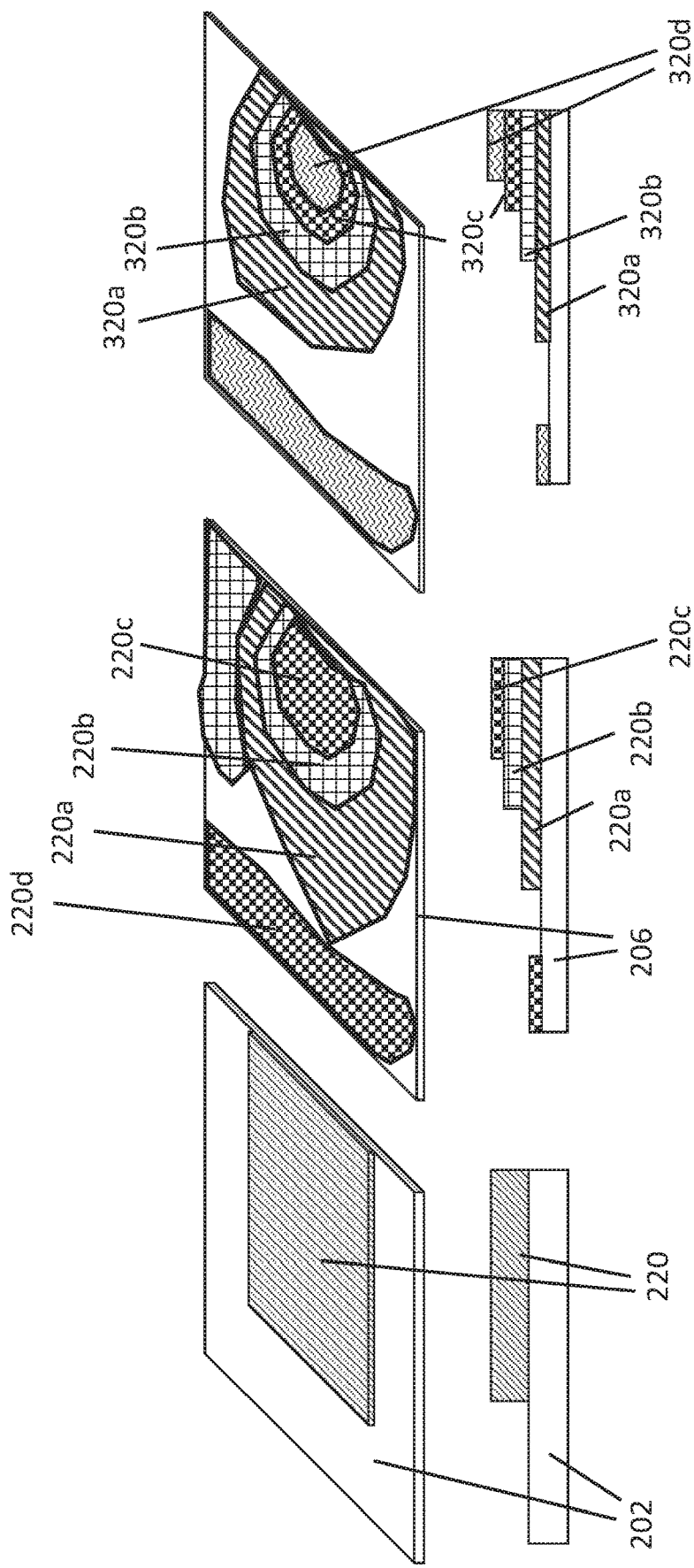

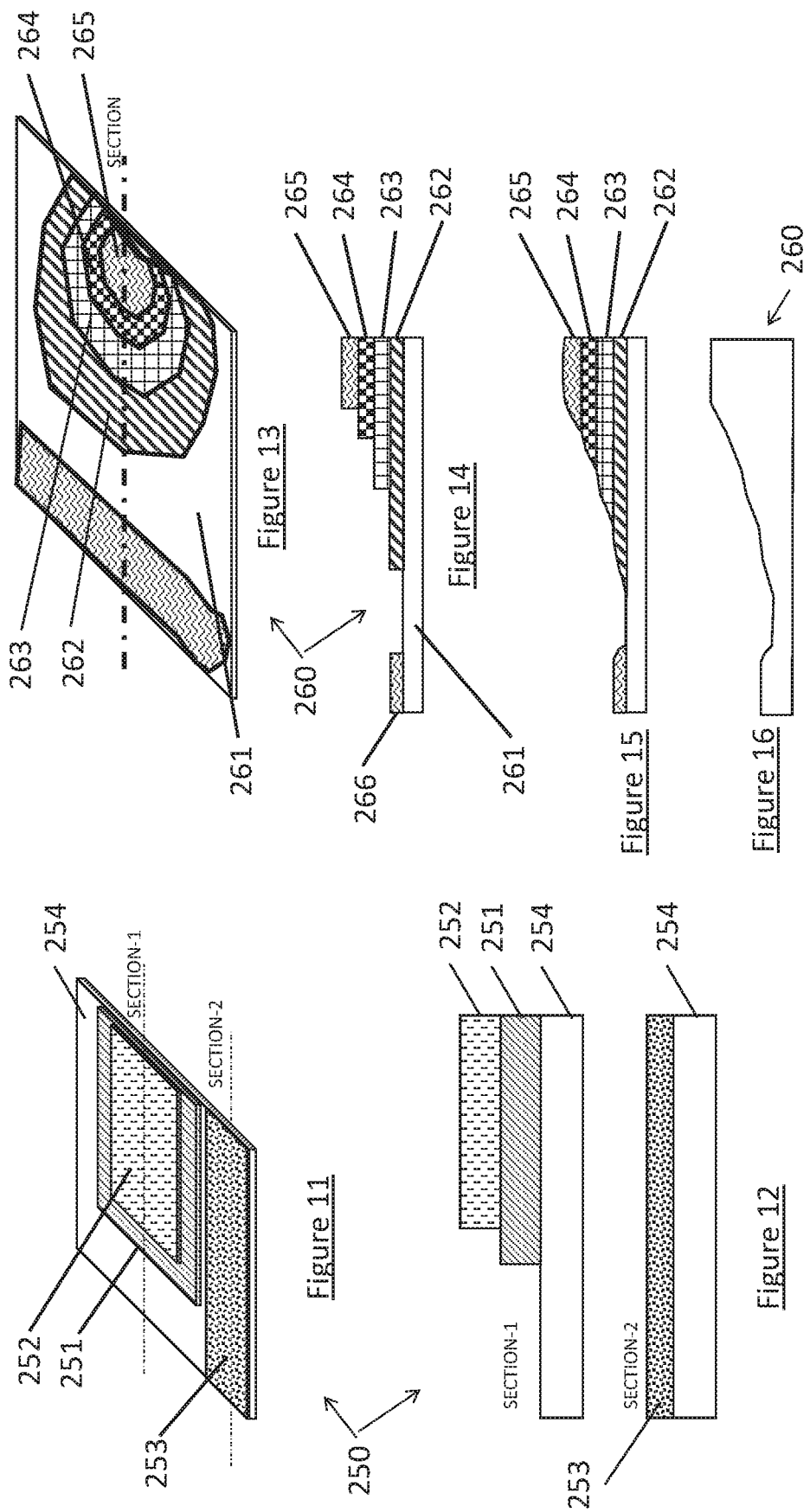

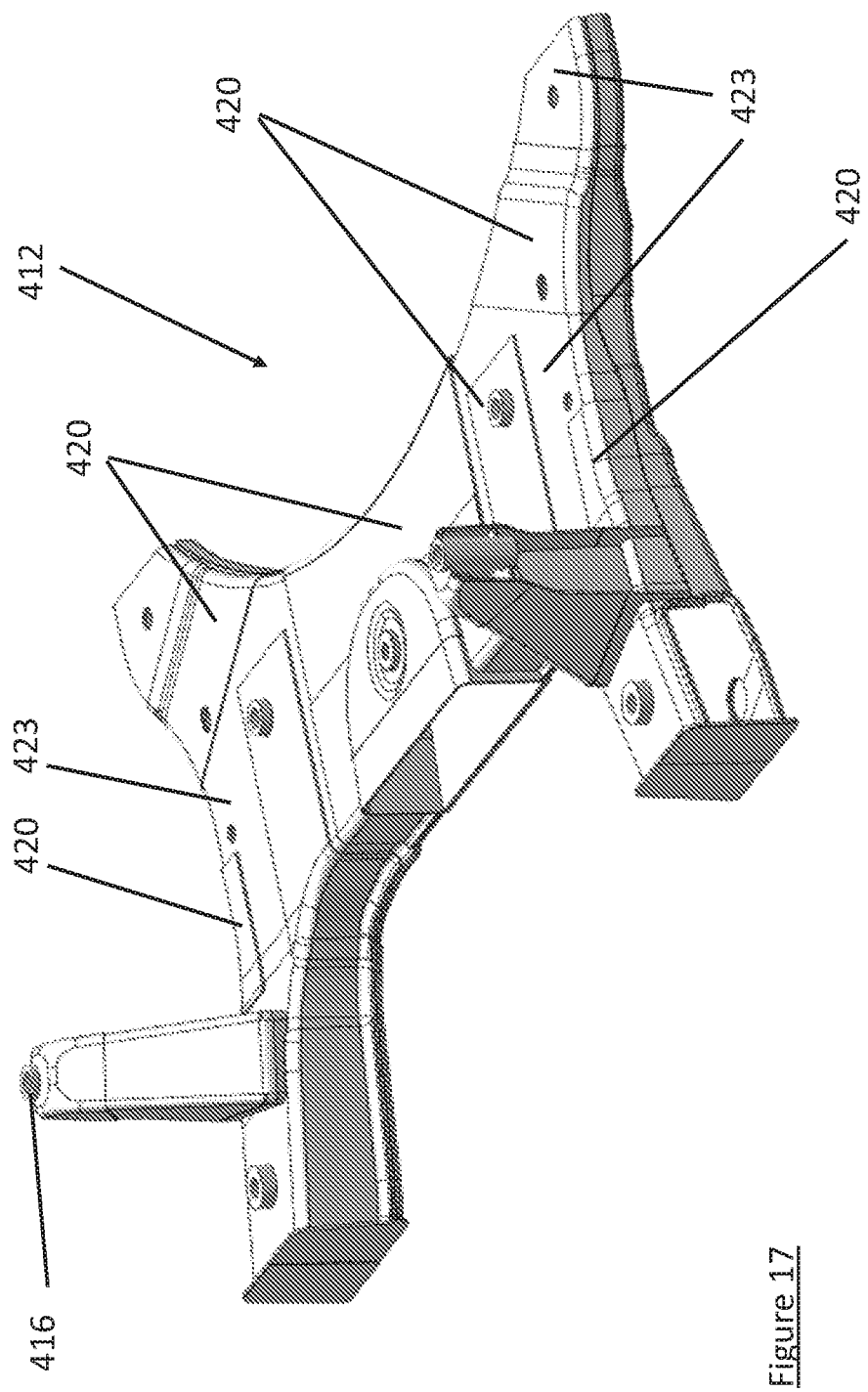

VARIABLE GAUGE CRADLE

CROSS-REFERENCE TO RELATED APPLICATIONS

This U.S. National Stage Patent Application claims the benefit of PCT International Patent Application Serial No. PCT/US2020/030953 filed May 1, 2020 entitled "VARIABLE GAUGE CRADLE" which claims the benefit of and priority to U.S. Provisional Patent Application Ser. No. 62/842,212, filed May 2, 2019, titled "Variable Gauge Cradle," the entire disclosures of which are hereby incorporated by reference.

FIELD OF THE DISCLOSURE

The present disclosure relates to automotive vehicle structures. More particularly, the present disclosure relates to a vehicle cradle structure.

BACKGROUND OF THE DISCLOSURE

Automotive vehicles, including vehicles powered by internal combustion engines, electric vehicles powered by batteries, and hybrid vehicles, include a variety of components that are assembled together to define the overall vehicle. The various components may include the engine, drivetrain, differential, control systems, and the like. Additionally, the vehicle is made up of many structural components that define the vehicle shape, which can also be referred to as the vehicle body.

Vehicles are typically constructed in stages, with different portions of a vehicle being assembled in different locations and at different times. This type of modular assembly process provides efficiency benefits for assembling the vehicle.

Accordingly, different modular portions may be assembled for a later overall assembly. One modular portion of the vehicle is the vehicle chassis. The vehicle chassis may include a structural component commonly referred to as a cradle. The cradle provides structure support to a variety of components and vehicle sub-assemblies, which can be mounted to the cradle prior to the final assembly. Once mounted to the cradle, additional components or subassemblies may be mounted to the cradle. At a later time, the vehicle body may be ultimately attached to the cradle as part of the vehicle assembly process.

When assembled, each vehicle component must be able to withstand the various loads and forces that occur during typical vehicle use, such as impact loads, acceleration loads, bumps, and the like. In response to undergoing loads during use, these vehicle components can in turn result in loads being applied to the cradle to which they are mounted. Heavier components may cause additional loads relative to lighter components.

Additionally, different vehicle constructions and installed components can result in different stiffness requirements for the cradle or sub-frame. These stiffness requirements can drive the sizing requirements for the cradle or sub-frame.

Vehicle cradles are typically made of a strong and stiff material, such as steel, to be able to sufficiently withstand the various loads that occur during typical vehicle use and provide the necessary stiffness. The cradle may be stamped from a particular sheet of steel, aluminum, or any metal material to define the overall shape of the cradle that can receive the various components thereon.

Due to the varying load levels and stiffness requirements undergone by the cradle due to different attached components, some portions of the cradle receive higher loads and/or require different stiffness than others. The cradle is typically designed and manufactured to be able to withstand the highest load levels undergone by the cradle as well as the highest stiffness requirements. Efforts have been made to distribute the load across the cradle in order to reduce the overall weight of the cradle. For example, it would be inefficient in a case with uneven load distribution, such that one side of the cradle had very high loads to withstand, with the other side having low loads to withstand. Such a cradle would require a material thickness sufficient to withstand the very high load, and this thickness would be far more than required on the opposite side where the loads are low. Even with attempts to distribute loads equally, there are still instances where some regions of the cradle have higher loads to withstand than others.

Thus, it is typically not possible to distribute the load and the design the cradle such that each portion of the cradle undergoes the same loads. Accordingly, some portions of the cradle are more robust than necessary, because the load requirements in those areas are lower. Reducing the thickness of the cradle overall will result in the cradle not being able to withstand the higher loads at other areas. A cradle with a higher thickness can have material removed in the reduced load areas, however such actions can be time consuming, difficult, and expensive, and the material cost is still elevated, as the removed material becomes waste.

In view of the above, improvements can be made the design and manufacture of vehicle cradles that can adequately tolerate the variable loads that occur across the cradle without being overly heavy or robust at areas with reduced loads.

SUMMARY

In one aspect, a structural frame for a vehicle is provided. The structural frame includes a plurality of interconnected panel portions defining a shape of the frame. Each panel portions has a variable thickness. The panel portions include a first thickness at a first zone and a second thickness at a second zone. The first thickness defines a minimum thickness of the panel portion. The second thickness defines a maximum thickness of the panel portion. The first thickness is defined by a first sheet of material. The second thickness is defined by the first sheet of a material and at least one patch attached to the first sheet of material.

In one aspect, the second thickness is defined by a plurality of patches stacked together on the first sheet.

In one aspect, the panel portions include a third thickness in a third zone, wherein the third thickness is between the minimum thickness and the maximum thickness.

In one aspect, the third thickness is defined by fewer patches than the second thickness.

In one aspect, the panels combine to define one or more hollow structures.

In one aspect, the hollow structure includes an upper portion attached to a lower portion, wherein the upper portion and lower portion are defined at least by a sheet of material.

In one aspect, the panel portions define a curved cross-section profile.

In one aspect, the at least one patch defines a curved profile corresponding to the curved profile of the panel portion to which it is attached.

In one aspect, the at least one patch is attached to the panel portion via a full surface bond.

In one aspect, the second zone is disposed within a perimeter of the third zone.

In one aspect, the frame is a perimeter cradle defining a closed loop and an open space within the closed loop. In one aspect, the frame is a k-frame.

In another aspect, a method of manufacturing a variable gauge structural component for a vehicle is provided. The method includes providing a panel portion of the structural component, the panel portion including at least a first sheet of metal having a first thickness, wherein the first thickness is a minimum thickness of the panel portion. The method further includes attaching at least one patch of additional metal material to the first sheet and defining a second thickness of the panel portion, wherein the first thickness is disposed in a first zone of the panel portion and the second thickness is disposed in a second zone of the panel portion. The second zone has a greater stiffness than the first zone.

In one aspect, the at least one patch is in the form of a sheet of metal material.

In one aspect, the at least one patch is deposited and attached via metal deposition onto the panel portion.

In one aspect, the at least one patch includes a first patch and a second patch, wherein the first patch is overlaid on the panel portion, and the second patch is overlaid on the first patch.

In one aspect, the second patch has a smaller footprint than the first patch.

In one aspect, the panel portion includes a second sheet attached to the first sheet and defining a hollow structure therebetween.

In another aspect, a vehicle subframe for mounting vehicle components thereto is provided. The vehicle subframe includes a plurality of interconnected frame portions, the frame portions including an upper portion attached to a lower portion and defining a hollow space therebetween. At least one of the upper portion or the lower portion has a variable thickness. The variable thickness includes at least a first thickness and a second thickness. The first thickness defines a base thickness corresponding to a thickness of a first sheet of material. The second thickness includes the first sheet of material and an additional layer of material attached thereto.

In one aspect, the second thickness includes multiple layers of material overlaid on the first sheet of material, wherein successive layers of material have a smaller surface area than the layer upon which they are disposed.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a partial perspective view of the perimeter cradle illustrating a side portion of the cradle and an opening in the side portion;

FIG. 6 is a cross-sectional view of a side portion of the cradle taken through the opening in the side portion, illustrating patches applied to a base sheet of material;

FIG. 7 is another cross-section view of the side portion, illustrating the patches separated from the base sheet of material;

FIG. 8 illustrates a panel having a base sheet of material and patch applied over a portion of the base sheet of material to selectively increase the thickness of the panel at the location of the patch;

FIG. 9 illustrates another panel with a topographical distribution of patches, with multiple patches overlaid on each other;

FIG. 10 illustrates yet another panel with a topographical distribution of patches;

FIG. 11 illustrates another panel with multiple patches of different surface areas overlaid on each other and a single layer patch disposed at another location on the panel;

FIG. 12 illustrates cross-sectional view of the panel of FIG. 11;

FIG. 13 illustrates a topographical distribution of patches, including multiple stacked patches and a single layer patch;

FIG. 14 illustrates a cross-sectional view of the panel of FIG. 13 with a stepped transition between layers;

FIG. 15 illustrates an alternative cross-sectional view of the panel of FIG. 13 with smoothed transitions between layers;

FIG. 16 illustrates an equivalent cross-section of the panel of FIG. 15, illustrating the smooth transition between layers of material;

FIG. 17 is a perspective view of a cradle having increased thickness at distinct areas, with the cradle in the form of a k-frame cradle;

DETAILED DESCRIPTION

With reference to FIGS. 1-21, a system 10 for supporting a variety of vehicle components includes a vehicle cradle 12 sized and arranged to accommodate a predetermined layout of vehicle components and payload. The cradle 12 is configured to have a variable thickness at different locations depending on the predetermined layout and expected loads corresponding to the predetermined layout.

It will be appreciated that various vehicle types include a variety of different vehicle components. Accordingly, the specific arrangement of the vehicle cradle 12 and its variable thickness as described herein is dependent on the arrangement of said various components. It will be further appreciated that the various components and predetermined layout may be arranged such that the vehicle cradle 12 will have different load and stiffness requirements at different areas, and that such requirements may be determined via computer modeling or the like, with specific regions being identified as having relatively higher or lower load requirements. Areas with relatively higher load and stiffness requirements will typically require a greater thickness. Reference will be made herein to the various vehicle cradles 12 illustrated; however it will be appreciated that the specific shapes of the cradle 12 and the variable thicknesses are exemplary and not limiting to the specific cradles and thickness shown.

Figure 2:
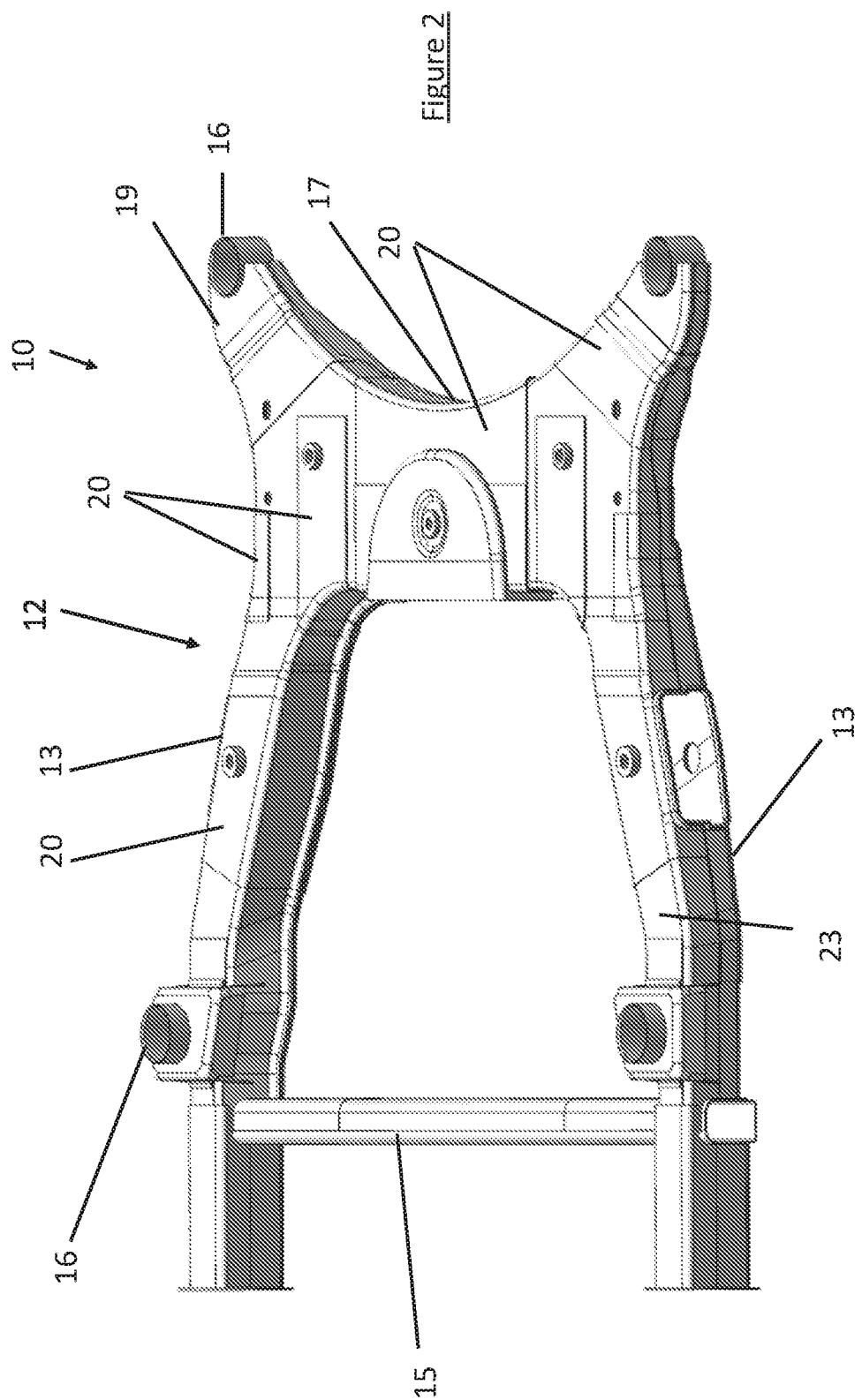
FIG. 2 is a perspective view of a perimeter cradle having increased thickness at different areas of the cradle.
Figure 3:
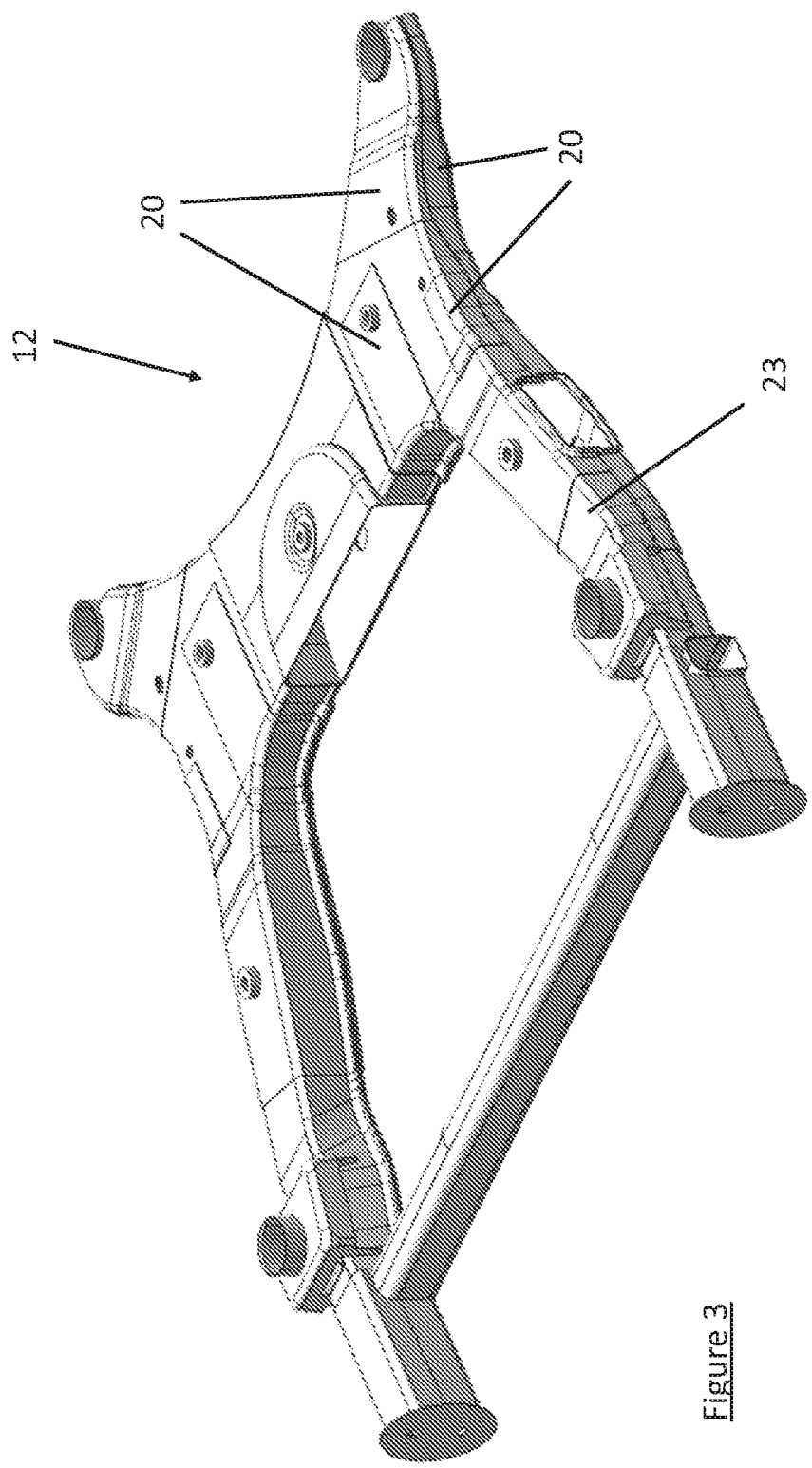
FIG. 3 is another perspective view of the perimeter cradle.
Figure 4:
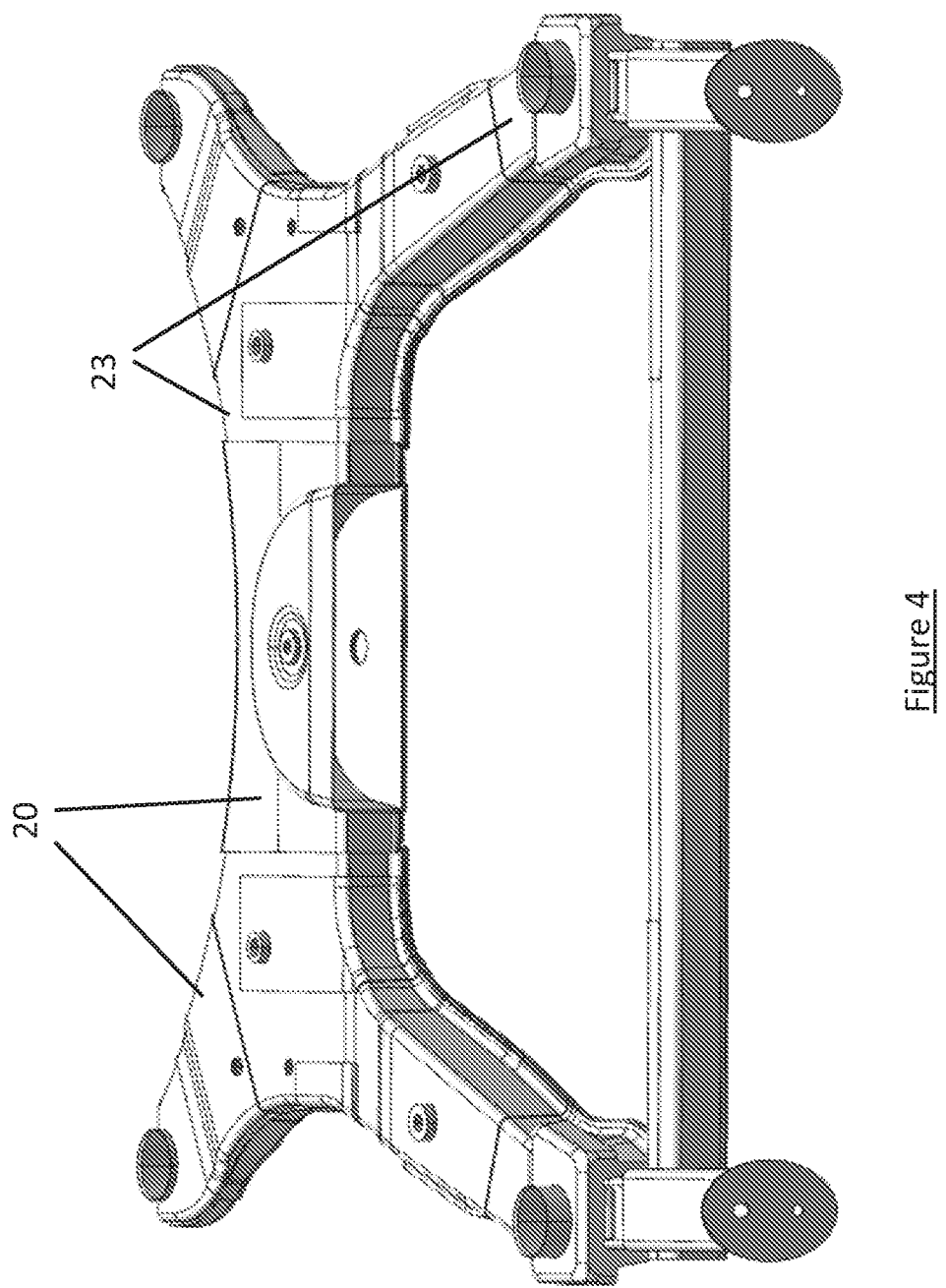
FIG. 4 is another perspective view of the perimeter cradle.
Figure 18:
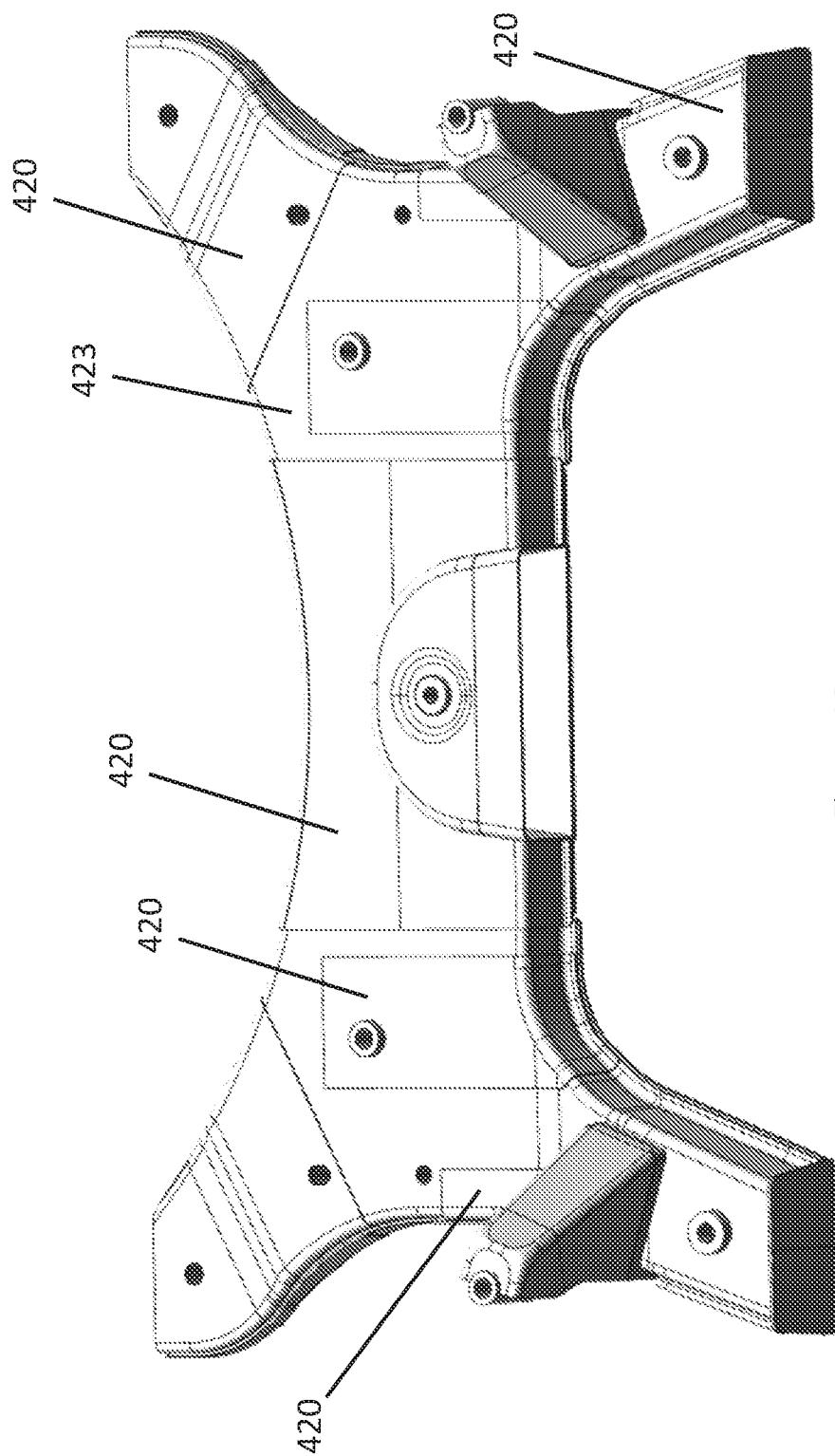
FIG. 18 is a top perspective view of the k-frame cradle.
Figure 19:
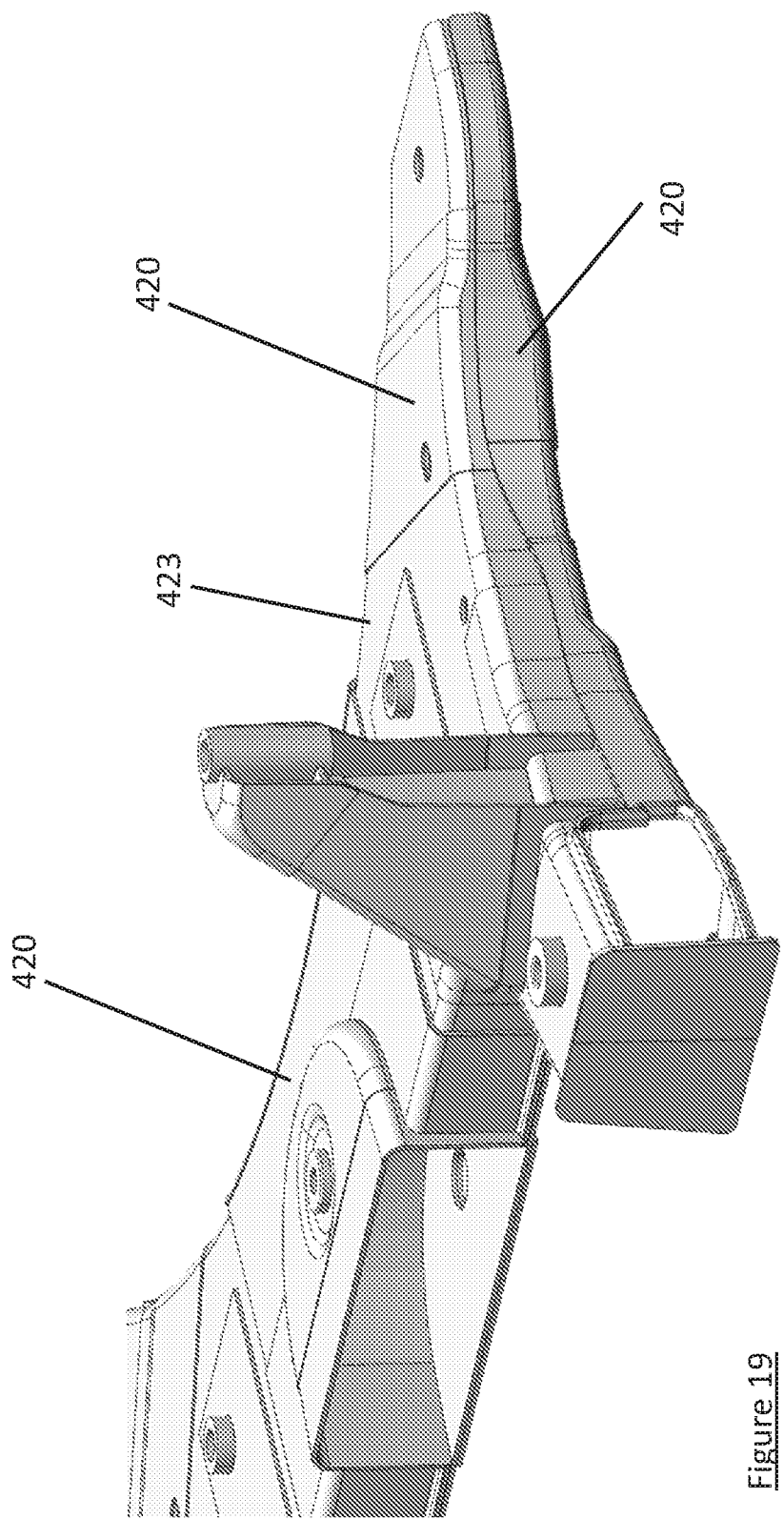
FIG. 19 is a partial perspective view of the k-frame cradle.
Figure 20:
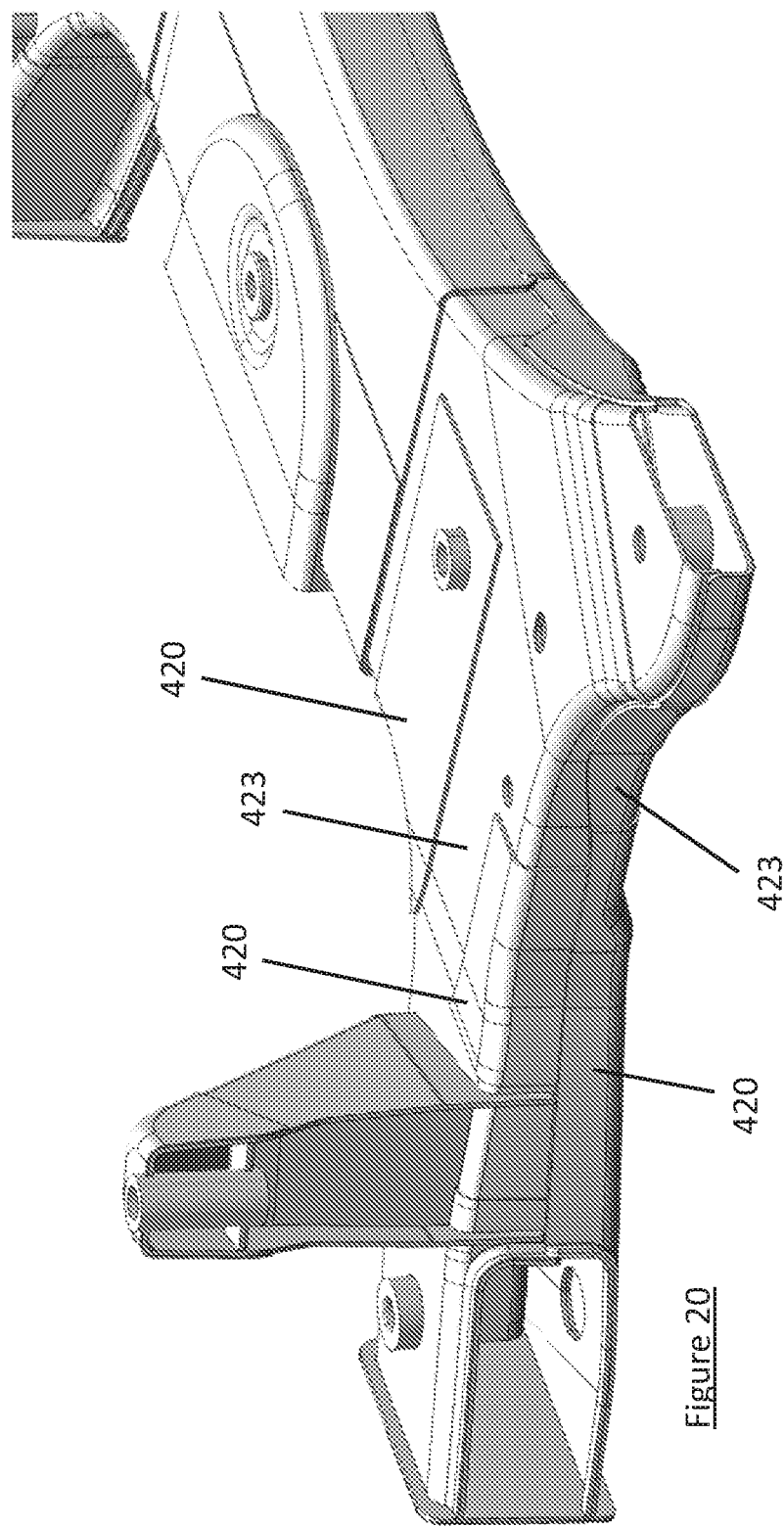
FIG. 20 is another partial perspective view of the k-frame cradle.
Figure 21:
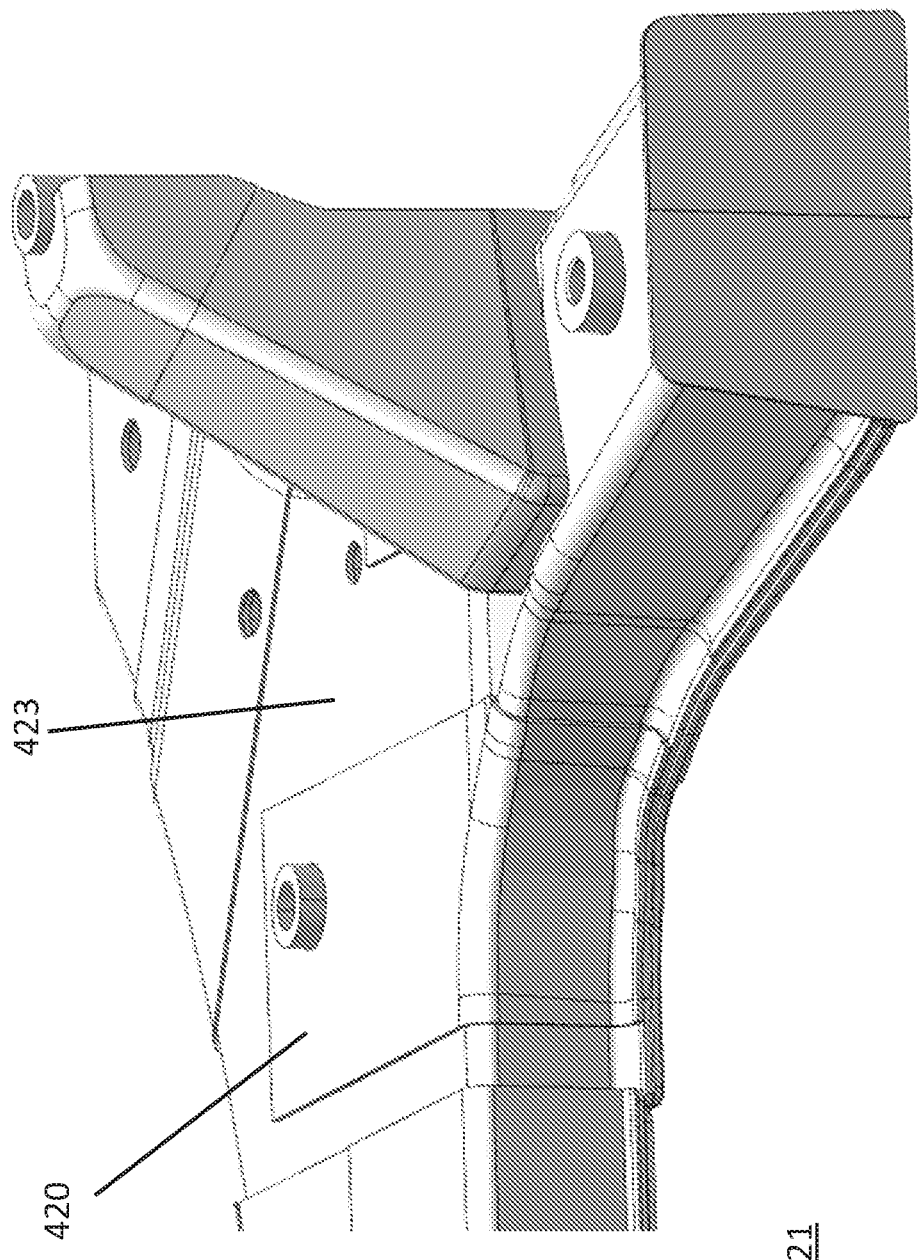
FIG. 21 is another partial perspective view of the k-frame cradle.

In one aspect, the cradle 12 may have a generally box-like overall shape defined by a plurality of linking structure, sections, or panels 14, as shown in FIG. 2, or a shortened shape, as shown in FIG. 17. It will be appreciated that other structural shapes may also be used. In one aspect, the box-like shape shown in FIG. 2 may be referred to as a "perimeter" cradle, and the elongate shape of FIG. 17 may be referred to as a "K-frame."

The panels 14 may combine to define the overall shape and layout of the cradle 12 and may also define a plurality of mounting locations 16 (such as sleeves, bushings, holes, or the like) for various vehicle components. The cradle 12 may be a perimeter cradle (FIGS. 2-7), a k-frame cradle (FIGS. 17-21), or other vehicle sub-frame component. The cradle 12 is configured to support various vehicle components as a sub-assembly, and is further configured to isolate other portions of the vehicle from loads and vibrations generated by the various vehicle components.

Figure 1:
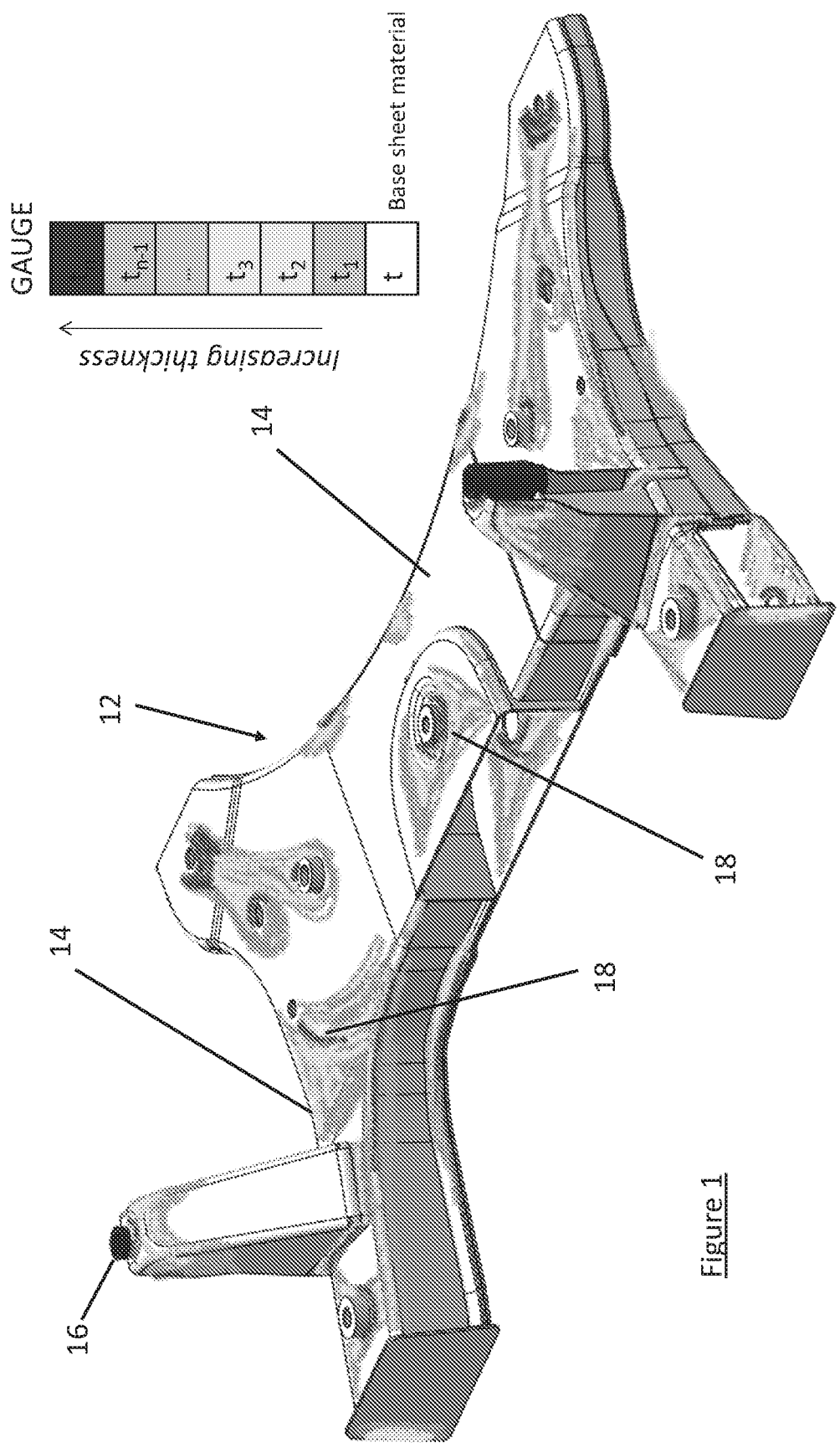
FIG. 1 is a perspective view of a vehicle cradle with a contour plot showing different stiffness requirements for different zones of the cradle based on computer modeling.

The cradle 12 illustrated in FIG. 1 is a specific cradle illustration for a specific layout of components, and is provided for illustrative purposes. Furthermore, FIG. 1 is provided to illustrate an example of different load requirements at different locations of the cradle 12, as determined via computer modeling or the like. Areas with different load and stiffness requirements are shown with shading indicating increased load and stiffness requirements, and therefore increased thickness is desirable in these areas.

The panels 14 making up the cradle 12 shape may accordingly include a plurality of zones 18 distributed along the panels 14. The zones 18 may be defined relative to each other as areas of the cradle 12 (or the panels 14 thereof) where different gauges or thicknesses are preferable to account for increased loads at the various zones 18. Accordingly, different zones 18 may have different load requirements, and correspondingly different thickness requirements.

As described above, the cradle 12 of the present disclosure is configured as a variable gauge cradle, such that different zones 18 may have different thicknesses. The specific thickness for selected zones 18 may be determined based on CAE modeling (Finite Element Analysis) and/or CAD modeling. Based on the modeling of the cradle 12, it may be determined which of the zones 18 require relatively large thicknesses and which of the zones 18 require relatively small thicknesses. It will be appreciated that the actual thicknesses of various zones 18 may depend on the specific design and shape of the cradle 12, as well as the specific components intended to be installed on the cradle 12 and the locations of these components. Accordingly, across different vehicle types and installations, the zones 18 that require a thicker gauge will be different from vehicle to vehicle and the various components intended to be installed. FIG. 1 illustrates one example of a cradle 12 having multiple zones with different stiffness and load requirements, and therefore different thicknesses.

In one aspect, the cradle 12 may have an "infinitely variable" thickness. In this approach, the CAE modeling may identify various zones and a preferred thickness at each zone 18, relative to a baseline thickness. In one example, the cradle 12 may have a thickness that ranges from 1 mm to 5 mm. The thicknesses may be determined using a stiffness based optimization program. The minimum thickness may be 1 mm, with the CAE modeling determining in which zones 18 the thickness shall be increased relative to the minimum thickness. The size and shape of the zones 18 having different thicknesses may depend on the modeling. In one example, a baseline reference mass for a similar cradle without variable thickness may be 25 kg, with a final mass as determined by the CAE model of a variable thickness cradle 12 being 18.6 kg using the stiffness based modeling and infinitely variable thickness of the cradle 12, such that a 6.4 kg mass savings is realized. The reduction in overall weight is due to the traditional cradle having extra thickness in regions or zones 18 where such thickness is unnecessary, such that the baseline thickness is higher than necessary relative to a variable thickness cradle. The variable thickness cradle 12 may have a baseline thickness that is relatively lower than the traditional cradle, with increased thickness in select locations, thereby requiring less material and resulting in lower overall weight. In several structurally sensitive zones, the select locations where additional material is also added includes along the radiuses of the formed sheet metal.

In a related example, CAD modeling may be used based on FEA results. In this example, thickness less than 1.5 mm may be set at 1 mm, thicknesses between 1.5 and 2.5 mm may be set at 2 mm, thicknesses between 2.5 and 4.5 may be set at 3.5 mm, and thicknesses greater than 4.5 mm may be set at 5 mm. Thus, the gauge range for the cradle 12 is still between 1 and 5 mm, but with specific stepped thicknesses to address different ranges of the results of the CAE modeling. In this approach, the baseline reference mass is 25 kg (the same as above), and the final mass of the CAD model is 20.7 kg, for a mass savings of 4.3 kg. Thus, there is still a mass savings realized relative to the initial baseline, although the mass savings is less than the "infinitely variable" thicknesses.

In the above CAD modeling example, thickness of the cradle 12 may be built up in layers having fixed thicknesses, resulting in stepped differences in thickness between different zones 18.

Of course, it will be appreciated that while the infinitely variable thickness is preferable, in practice, localized thicknesses based on ranges may be easier to implement. One approach to increasing thickness in localized zones may be accomplished using patches 20, as further described below.

With reference to FIG. 2, a plurality of patches 20 are shown applied to the cradle 12 to increase the thickness of the cradle 12 at select locations. The patches 20 may have varying thicknesses, depending on the desired overall thickness of a specified area of the panel 14 or portion of the cradle 12. The patches 20 may be bonded/fused/unified to a base sheet 23 of material via a full contact bond (area fusion), such that the patches 20 may be used to locally thicken specific areas. In this aspect, patch 20, made of metal, is placed and bonded on the parent panel (also referred to as a sheet or base sheet). It will be appreciated that various types of full contact bonding may be utilized to bond the patches 20 to the base sheet 23.

In one aspect, the thickness of the base sheet may be the minimum gauge of the sheet of material forming the panel portion of cradle 12, which may also be referred to as the baseline thickness. In the above examples (with a range of 1 mm to 5 mm), the thickness of the panel 22 may be 1 mm. The thickness of the patch 20 may be the difference between the desired gauge or thickness and the thickness of the base panel 22. Accordingly, in the above examples, for the zone 18 where a 2 mm thickness would be desired used, the patch 20 may be 1 mm thick and applied to the 1 mm base sheet 23. For the zone 18 that is 5 mm thick, the patch 20 may be 4 mm thick and applied to the 1 mm base sheet 23. Various other patch thicknesses may be used in other zones 18. In the case of a thicker patch 20, the stepped difference in thickness relative to the baseline thickness is greater than for thinner patches 20. The stepped difference in thickness may be reduced, eased, or transitioned by layering multiple patches 20 over each other, with these patches having different perimeter sizing or surface areas. FIGS. 8-10 schematically illustrate different arrangements and numbers of patches, which are described in further detail below.

In one aspect, multiple patches 20 may be applied in a stack to reach the desired overall thickness. For example, for a 5 mm zone, four 1 mm thick patches 20 may be applied to the 1 mm thick base sheet 23. The edges or adjacent stacked layers of patches 20 may be offset relative to each other, thereby allowing for an eased transition from the baseline thickness to the maximum thickness of the zone 18.

Accordingly, the use of the patches 20 in localized areas allows for the ability to create parts, components, or sub-frames, such as the cradle 12, with a variable thickness throughout. The patches 20 may be used to locally thicken various portions of the sub-frame or cradle 12. By using defined stiffness targets for the cradle 12, patch level and element (small discretized structural unit) level gauge optimization may be used to identify areas or zones 18 of the sub-frame or cradle 12 that can benefit from varying thickness. Accordingly, if a single area or zone 18 requires an increased gauge or thickness, it may be locally thickened rather than having to increase the gauge or thickness of the entire component, thereby saving on overall mass and increasing product performance.

According to analysis of this approach, a perimeter type cradle 12 may save about 8% of mass, and a k-frame type cradle may save from 1-5% of mass when using the patches 20 to locally thicken zones 18 from a baseline thickness. For an infinitely variable gauge or thickness design with gauges ranging from 1.6-5 mm, perimeter cradles 12 may save 14% of mass, with k-frame cradles 12 saving about 11%. Of course, the specific weight savings relative to traditional cradles is dependent on the actual weight of the traditional cradle design and the specific layout of components across the cradle 12. However, as illustrated, some degree of weight savings relative to a traditional cradle may be realized by selectively increasing thickness from a reduced baseline thickness is made possible by the present disclosure.

In another example, when modeling the cradle 12 with stiffness based optimization, but with a gauge range of 1.6-5 mm rather than 1-5 mm, there are fewer zones 18 in which increased thicknesses are identified. The baseline thickness in this approach, being thicker at 1.6 mm vs 1.0 mm in the previous example, therefore requires fewer areas where increased thickness is desired. In an infinitely variable approach, there are still multiple zones 18 in which increased thickness is necessary. Again, the baseline mass of the cradle 12 is 25 kg, with the mass of the infinitely variable cradle 12 being reduced in this case to 21.4 kg, for a 3.6 kg mass savings.

In another example, another approach to varying thickness of the cradle 12 using patches 20 may be used. In this approach, the gauges range from 1.0 to 5 mm. The cradle 12 is split into multiple zones 18 based on the average thickness. The baseline mass is 25 kg, with the resulting mass of this approach being 22.7 kg, for a mass savings of 2.3 kg. The minimum thickness is 1.0 mm, with a variety of different thicknesses disposed around the cradle 12, up to a thickness of 5 mm. Other zones 18 have a thickness that is between 1 and 5 mm. In this approach, single patches 20 are used, with different patches 20 having different thicknesses to arrive at the overall thickness.

In the above-described models, the result of the variable thickness cradles is compared to a baseline mass. The baseline mass is based on an "original" thickness of the illustrated cradle 12, which is less than 4 mm. When modeling the desirable thickness for a variable thickness cradle 12, the maximum thickness may be set at the original thickness or may be set at a maximum thickness that is greater than the original thickness. The maximum thickness being greater than the original thickness for the same given layout of components allow the variable gauge cradle 12 to provide additional thickness and strength in zones 18 of need. In the traditional cradle, a thickness corresponding to the maximum thickness of the variable gauge would result in cradle 12 that is overly heavy.

When modeling with a maximum thickness based on the original thickness, the resulting necessary thickness is less variable, because a structural optimization process does not add larger thicknesses in certain areas. Accordingly, additional thickness is added in other areas to compensate.

When modeling with a maximum that is above the original thickness, for example with a maximum thickness of 4 mm, the thickness across the cradle 12 can vary more, because areas of need can be addressed specifically, and therefore other areas can have further reduced thicknesses.

For example, with the baseline mass of 25 kg, when the range is from 0.0 to 4 mm, the CAE modeled mass is below the baseline. When the range is from 0.0 to original thickness, the CAE modeled mass is below the baseline.

In another example, a CAE model of a k-frame style cradle 12 is used. The thickness ranges from 1.005 to 5.8 mm. Much of the cradle 12 has a minimum thickness, with various zones 18 having higher thicknesses. In particular, sleeves 16 (such as those shown in FIG. 1) are indicated at the maximum thickness. A baseline mass of this cradle 12 may be 20.0 kg, with the CAE modeled mass being 16.3 kg, for a mass savings of 3.7 kg.

In yet another model of the k-frame style cradle 12, the gauges range from 1.6 to 5 mm. In this example, a larger portion of the cradle 12 is at the minimum thickness, with fewer zones 18 having increased thickness relative to the previous example. The sleeves 16, again, may have maximum thickness. The baseline mass is 20.0 kg, and this model results in a mass of 17.7 kg, for a mass savings of 2.3 kg.

Thus, in view of the above, the variable gauge cradle 12 may provide the necessary stiffness of a typical cradle, but with reduced mass, by having localized areas or zones 18 with increased thickness. The increased thickness may be greater than the original thickness of the traditional cradle, allowing for reduced thicknesses in other areas.

Accordingly, a cradle or sub-frame may include a plurality of interconnected panels 14 that define a shape of the cradle 12, as shown in FIG. 2, for example. The panels 14 may have a first thickness disposed along a first portion of the panels 14, wherein the first thickness is a minimum thickness of the cradle 12 as defined by a base sheet 23 of material. When referring to the thickness of the cradle 12, it will be appreciated that the thickness is in reference to the wall of the panel structure or cradle structure. The cradle 12 may be made up multiple sheets or material joined together to define a hollow beam shape or similar structure, and the thicknesses described are typically in reference to the wall structure that defines the hollow structure. The panels 14 may further include a second thickness disposed at a second portion of the panels 14. The panels 14 may further include a third thickness disposed at a third portion of the panels 14, wherein the third thickness is an intermediate thickness of the cradle 12. The second thickness may be greater than the first thickness and the third thickness. In one aspect, the second and third thicknesses are defined by a patch 20 applied to the base sheet 15 of material, such that the combined thickness of the base sheet 23 and the patch 20 (or patches 20) defines the thickness of the panel 14 and the location of the layered patch(es) 20.

In another aspect, the variable thickness of the cradle 12 may be accomplished by other manufacturing methods other than additional sheets of material. For example, metal deposition techniques, such as cold spray or sintering (additive manufacturing methods), may be used to add thickness to identified local zones 18 of the cradle 12. The additional material may be built up on the base sheet of material 23 and may define the patch 20.

In another aspect, the above-described variable gauge or thickness may be applied to other structural components of the vehicle other than the cradle 12. For example, the variable gauge approach may be applied to frame rails, B-pillars, and the like.

In view of the above, and with reference to FIGS. 2-7, one example of the cradle 12 is shown having patches 20 disposed at various locations in accordance with the increased load tolerance at different zones 18 as determined by modeling. The locations of the patches 20 are locations where increased thickness is determined to be desirable to account for increased load or stiffness requirements.

The cradle 12 shown in FIG. 2 may be considered to be a generic sub-frame component, shown in the form of a perimeter cradle. The cradle 12 is shown having a generally symmetrical shape relative to a fore-and-aft direction and includes first and second side portions 13. As shown, side portions 13 have a generally symmetrical arrangement. The side portions 13 are connected via a laterally extending support beam 15 and a front portion 17. The patches 20 disposed around the cradle 12 are also illustrated as being disposed symmetrically.

The cradle 12 further includes a pair of end patches 19 that extend outwardly from the front portion 17. The end patches 19 include support sleeves 16 configured for mating with additional vehicle structure. The cradle 12 forms a generally closed loop and includes an open space defined by the closed loop shape.

The side portions 13 also include support sleeves 16 configured for mating with additional vehicle structure. The portions 13, 15, 17 described herein may be in the form of generally hollow structures formed by an assembly of formed sheet metal portions, and may also be generally described as a panel portion 14. For example, as shown in FIGS. 6 and 7, each side portion 13 may include an upper sheet 13a attached to a lower sheet 13b to define the hollow structure of the beam shape. Similarly, the laterally extending support beam 15 may have an upper portion and a lower portion that are joined together to create a hollow structure. The various panels and sheets of the cradle 12 may be joined together via welding or similar material joining processes. In another aspect, the beam structure may be a single sheet bent to define a hollow structure. In any case, the patches 20 may be applied to a base layer or sheet of material having a first thickness defining a minimum thicknesses or gauge, with the patches 20 selectively increasing the thickness and stiffness of the structure at the corresponding location.

The hollow structure of the cradle 12 may provide for a robust structure while also reducing weight, and may also provide a conduit for various wiring or other lines, if desired. The hollow structure of the cradle 12 may further include access openings 25, such as the opening 25 shown in FIG. 5 (the cross-section of which is shown in FIGS. 6 and 7).

An example of the hollow structure of the cradle 12, as well as the openings 25, is illustrated in FIGS. 6 and 7, which is a cross-sectional view of one of the side portions 13. FIG. 6 illustrates the cradle 12 with patches 20 applied at the location of the cross-section. Upper portion 13a at the location of the cross-section includes an upper base sheet 23 having a first thickness. The first thickness may generally correspond to the minimum desired thickness of the side portion 13, and in particular of the upper portion 13a and lower portion 13b. In one aspect, the upper portion 13a and lower portion 13b have the same first thickness. In one aspect, the first thickness may be 1 mm. Applying patches 20 to the upper or lower portions of the side portion 13 can thereby selectively increase the thickness of the upper and/or lower portions at the desired locations. It will be appreciated that the various thickness of the patches and the base sheets may be different relative to each other, with the overall thickness in any particular area or cross-section being the combination of stacked thicknesses of material in such areas.

The overall thicknesses of the cradle 12 at various locations is dependent on the size, shape, and number of patches 20 disposed around the cradle 12. The patches 20 may be sized and shaped to correspond to the shape and/or curvature of the cradle 12 at the location where the patches 20 are to be disposed. For example, as shown in FIGS. 6 and 7, the patches 20 have a curvature that wraps around and matches the curvature and profile of the upper and lower portions 13a, 13b.

FIG. 7 is similar to FIG. 6, illustrating the same cross-section, but with FIG. 7 illustrating the patches 20 spaced away from the upper and lower portions 13a, 13b. As shown, the patches 20 may have a similar profile as the upper and lower portions 13a, 13b over which they are placed, such that a close fit and sufficient surface bond between the materials may be accomplished.

Depending on the base thickness of the panel or sheet 25 forming the walls of the cradle 12 structure, the thickness and distribution of patches 20 may be different for handling a predetermined load distribution. Put another way, given a predetermined distribution of components across a given cradle 12 shape, a base thickness that is greater may have fewer patches 20, but may have an increased weight. For example, if the base sheet is 2 mm rather than 1 mm, then patches 20 used to increase the thickness at a particular location would not be used, and patches 20 may only be used where thicknesses greater than 2 mm are desired. A determination of the base thickness or minimum thickness of the walls of the cradle 12 may be adjusted depending on the range of desired thicknesses. For example, range of thicknesses where the minimum thickness is present over only a small percentage of the cradle 12 may be undesirable due to the increased number of patches 20 to be used to cover the remainder of the cradle 12. However, when the minimum thickness is present over a large percentage of the cradle 12, then it is likely that extra thickness is present in areas where it is not necessary, increasing the weight of the cradle 12.

An example of such a concept is shown in FIGS. 8-10. In FIG. 8, panel 14 includes a base sheet 202 having a first thickness. A patch 220 having a second thickness is disposed on sheet 202, with patch 220 having a relative large surface area. The first and second thicknesses combine in the area of the patch 220 to define an overall second thickness of the panel 14.

In FIG. 9, base sheet 206 has a thickness that is less than the thickness of sheet 202. As shown, a topographical distribution may be used, and additional patches 220a, 220b, 220c may be layered on top of each other, with each patch having a different surface area to create the topographical distribution of thicknesses over different areas or zones of the panel. The thickness of each of the patches 220a, 220 b, 220c may vary, or they may have the same thickness. By having variable patch thicknesses, a more topographical and tailored distribution may be used. By using a uniform thickness, the topographical distribution may be less precise, but still providing substantial mass saving. Patch 220d is disposed along the left side of sheet 206, due to sheet 206 having a reduced thickness relative to sheet 202. Sheet 202 did not include a patch along its left side, because its increased overall thickness provided the necessary stiffness.

FIG. 10 illustrates yet another example of a topographical distribution having lowered gauge limits. For example, on the right side of the figure, four patches 320a, 320b, 320c, 320d are shown stacked, relative to the three patch 220 layers shown in FIG. 9.

FIGS. 11 and 12 illustrates yet another example of a large patches, arranged similar to the topographical patches of FIGS. 9 and 10 with decreased surface areas overlaid on each other. In this example, multiple patches are used and define a stepped difference in thickness. Patches 251 and 252 are layered on top of each other, with patch 252 being smaller than patch 251. Patch 253 is a single layer, and disposed in a separate area from patches 251, 252, such that patch 253 does not overlap. Accordingly, there are four different thicknesses distributed across panel 250 in this example, with base layer 254 defining the minimum thickness.

FIGS. 13-16 illustrate yet another example of topographical distribution and a comparison between stepped and eased transitions between patches. In this example, panel 260 includes base layer 261, and patches 262, 263, 264, 265 are stacked together, with decreasing surface areas with different thicknesses of the panel depending on location within the stackup. Patch 266 is separate from patches 262-265 and does not overlap, and is a single layer. In this approach, there are six different thicknesses defined and a more tailored distribution of panel thickness relative to the large rectangular steps.

FIG. 15 illustrates where the transition between layers is smoothed, and the transition between layers is generally not distinguishable. Put another way, the layers of patches are not stepped. FIG. 16 shows the variable thickness, illustrating the smoothed transition without the layers specifically shown.

As described previously, the cradle 12 may be in the form of a k-frame cradle. Such an example of a k-frame cradle 412 is illustrated in FIGS. 17-21, which illustrate various views of base sheet 423 covered in specific areas with patches 420. The k-frame cradle 412 may resemble the cradle 12 in similar ways, including sleeves 416 or other mounting structure for attached to other vehicle components. Upper and lower portions of various sections of the cradle 412 may be joined together to create a hollow structure. The patches 420 may have a shape and curvature corresponding to the shape and curvature of the base sheets 423 forming the portions or panels of the cradle 412.

It will be appreciated that many other structural components may have patches applied thereto for similar reasons of increasing stiffness. The structures, including the cradles described herein, need not necessarily be hollow structures. A single solid sheet or other structural shape may be used for the mounting structure with patches disposed thereon to selectively increase thickness as desired.

Obviously, many modifications and variations of the present invention are possible in light of the above teachings and may be practiced otherwise than as specifically described while within the scope of the appended claims.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A structural frame for a vehicle, the structural frame comprising:
   a plurality of interconnected panel portions defining a shape of the frame;
   wherein each panel portion has a variable thickness;
   wherein the panel portions include a first thickness at a first zone and a second thickness at a second zone;
   wherein the first thickness defines a minimum thickness of the panel portion;
   wherein the second thickness defines a maximum thickness of the panel portion;
   wherein the first thickness is defined by a first sheet of material;
   wherein the second thickness is defined by the first sheet of a material and at least one patch attached to the first sheet of material;
   wherein the panel portions define a curved cross-section profile.

2. The frame of claim 1, wherein the second thickness is defined by a plurality of patches stacked together on the first sheet.

3. The frame of claim 1, wherein the panel portions include a third thickness in a third zone, wherein the third thickness is between the minimum thickness and the maximum thickness.

4. The frame of claim 3, wherein the third thickness is defined by fewer patches than the second thickness.

5. The frame of claim 1, wherein the panels combine to define one or more hollow structures.

6. The frame of claim 5, wherein the hollow structure includes an upper portion attached to a lower portion, wherein the upper portion and lower portion are defined at least by a sheet of material.

7. The frame of claim 1, wherein the at least one patch defines a curved profile corresponding to the curved profile of the panel portion to which it is attached.

8. The frame of claim 1, wherein the at least one patch is attached to the panel portion via a full surface bond.

9. The frame of claim 3, wherein the second zone is disposed within a perimeter of the third zone.

10. The frame of claim 1, wherein the frame is a perimeter cradle or a k-frame.

11. A method of manufacturing a variable gauge structural component for a vehicle, the method comprising the steps of:
    providing a panel portion of the structural component, the panel portion including at least a first sheet of metal having a first thickness, wherein the first thickness is a minimum thickness of the panel portion;
    attaching at least one patch of additional metal material to the first sheet and defining a second thickness of the panel portion, wherein the first thickness is disposed in a first zone of the panel portion and the second thickness is disposed in a second zone of the panel portion;
    wherein the second zone has a greater stiffness than the first zone;
    wherein the panel portion defines one or more hollow structures, wherein the hollow structure includes an upper portion attached to a lower portion, wherein the upper portion and the lower portion are defined at least by a second sheet of metal attached to the first sheet of metal and defining the hollow structure therebetween.

12. The method of claim 11, wherein the at least one patch is in the form of a sheet of metal material.

13. The method of claim 11, wherein the at least one patch is deposited and attached via metal deposition onto the panel portion.

14. The method of claim 11, wherein the at least one patch includes a first patch and a second patch, wherein the first patch is overlaid on the panel portion, and the second patch is overlaid on the first patch.

15. The method of claim 14, wherein the second patch has a smaller footprint than the first patch.

16. A vehicle subframe for mounting vehicle components thereto, the vehicle subframe comprising:
   a plurality of interconnected frame portions defined by a plurality of sheets of material, the frame portions including an upper portion attached to a lower portion and defining a hollow space therebetween, wherein the upper portion and the lower portion are defined at least by a sheet of material of the plurality of sheets of material;
   wherein at least one of the upper portion or the lower portion has a variable thickness;
   wherein the variable thickness includes at least a first thickness and a second thickness;
   wherein the first thickness defines a base thickness corresponding to a thickness of a first sheet of material of the plurality of sheets of material;
   wherein the second thickness includes the first sheet of material and an additional layer of material of the plurality of sheets of material attached thereto.

17. The vehicle subframe of claim 16, wherein the second thickness includes multiple layers of material overlaid on the first sheet of material, wherein successive layers of material have a smaller surface area than the layer upon which they are disposed.

18. The vehicle subframe of claim 16, wherein the frame portions define a curved cross-section profile.

19. The method of claim 11, wherein the panel portion defines a curved cross-section profile.

20. A method of manufacturing a variable gauge structural component for a vehicle, the method comprising the steps of:
   providing a panel portion of the structural component, the panel portion including at least a first sheet of metal having a first thickness, wherein the first thickness is a minimum thickness of the panel portion;
   attaching at least one patch of additional metal material to the first sheet and defining a second thickness of the panel portion, wherein the first thickness is disposed in a first zone of the panel portion and the second thickness is disposed in a second zone of the panel portion;
   wherein the second zone has a greater stiffness than the first zone;
   wherein the panel portion defines a curved cross-section profile.

21. The method of claim 20, wherein the at least one patch includes a first patch and a second patch, wherein the first patch is overlaid on the panel portion, and the second patch is overlaid on the first patch.

* * * * *